United States Patent Office 3,772,269
Patented Nov. 13, 1973

3,772,269
GLYCOSIDE COMPOSITIONS AND PROCESS FOR THE PREPARATION THEREOF
Baak W. Lew, Ardentown, Del., assignor to ICI America Inc., Wilmington, Del.
No Drawing. Filed July 24, 1969, Ser. No. 844,625
Int. Cl. C07c 47/18
U.S. Cl. 260—210 R
12 Claims

ABSTRACT OF THE DISCLOSURE

Glycoside compositions are prepared by reacting a monosaccharide, or a compound hydrolyzable to a monosaccharide, with a monohydric alcohol having from 8 to 25 carbon atoms, in the presence of an acid catalyst and in the presence of an alkylene glycol containing from three to five carbon atoms. The glycoside compositions of the present invention are useful as detergents, gelling agents, lubricants, wetting agents, dyeing assistants, textile softeners, and food emulsifiers.

The present invention relates to glycoside compositions and to processes for the preparation thereof. More particularly, this invention relates to glycoside compositions comprising a mixture of higher alkyl glycoside and glycol glycoside and to processes for the preparation of such glycoside compositions.

U.S. patent application Ser. No. 703,539, now Pat. No. 3,598,865 entitled Polyglycosides and Process of Preparing Mono- and Polyglycosides, filed by Baak W. Lew on Feb. 7, 1968, discloses the preparation of mono- and polyglycosides by reacting a monosaccharide with a monohydric alcohol having from 8 to 25 carbon atoms, in the presence of an acid catalyst and in the presence of a latent solvent which is a primary or secondary alcohol having from three to five carbon atoms. This process has the disadvantages that large amounts of the latent solvent are required and that the process is commercially feasible only with crystalline sugars. A U.S. patent application entitled Improved Process for the Preparation of Mono- and Polyglucosides, filed of even date herewith by Baak W. Lew, discloses the preparation of mono- and polyglycosides by reacting a monosaccharide with a monohydric alcohol having from 8 to 25 carbon atoms in the presence of an acid catalyst and in the presence of an aliphatic ether-alcohol having a boiling point at atmospheric pressure of no more than about 200° C. While the use of an aliphatic ether alcohol instead of a primary or secondary alcohol having from three to five carbon atoms has resulted in the solvent requirement being reduced to more practical proportions and, furthermore, has enabled the use of non-crystalline sugars such as syrups, nevertheless, the use of this aliphatic ether solvent introduces the undesirable property of toxicity into the resulting glycoside product. Moreover, in both processes, either large excesses of monohydric alcohol having from 8 to 25 carbon atoms are required for the reaction with the sugar to produce low molecular weight, tractable, low melting glycosides, or alternatively, if lower ratios of fatty alcohol to monosaccharide are used, intractable high melting or non-melting high molecular weight polyglycosides are produced. The production of high melting or non-melting high molecular weight polyglycosides require processing in the solid state and thus necessitate the use of specialized high cost equipment.

It is an object of this invention to provide a process whereby all of the above difficulties are overcome, that is a non-toxic solvent is used, large amounts of the solvent are not required, low cost syrupy sugars may be used as well as crystalline sugars, and tractable, low-melting, low-molecular weight glycoside products may be produced without the use of large excesses of fatty alcohols.

It is another object of this invention to provide novel glycoside compositions.

The foregoing object and further objects are accomplished according to the present invention by providing a process for the preparation of glycoside compositions which process comprises reacting a compound selected from the group consisting of monosaccharides and compounds hydrolyzable to monosaccharides with a mixture of a monohydric alcohol containing from 8 to 25 carbon atoms and an aliphatic glycol containing from 3 to 5 carbon atoms, said reaction being conducted in the presence of an acid catalyst.

It has been found, quite unexpectedly, that when the reaction of the monosaccharide with the monohydric alcohol is carried out in the presence of glycol, the process of polyglycosidation, although not entirely eliminated, is greatly retarded. Thus the degree of glycosidation may be kept at a low level so that the product never becomes so high in molecular weight that it becomes intractable, but remains low melting and fluid throughout the reaction. By carrying out the reaction in the presence of a glycol, very low ratios of monohydric alcohol to sugar may be used without encountering highly polyglycosidated non-melting, intractable products.

In the reaction, the glycol serves the dual function of being a solvet for the higher monohydric alcohol and the monosaccharide and as a reactant with the sugar. The resulting surface active glycosidic composition thus formed is a complex mixture of glycosides of the higher monohydric alcohol and glycosides of the glycol.

The molar ratio of the glycol to the monohydric alcohol determines the composition of the resulting glycoside product. The mixture varies from being predominantly the glycosides of the monohydric weight alcohol to predominantly the glycosides of the glycol. Thus the presence of the glycol serves the useful purpose of being a liquifier and a modifier during the reaction to produce useful surface active glycosidic compositions which could not be produced otherwise.

Monosaccharides from which glycosides of the present invention are prepared include the hexoses and pentoses. The term is extended to include compounds readily hydrolyzable to the said monosaccharides. Typical examples of suitable monosaccharides include glucose, mannose, galactose, talose, allose, altrose, idose, arabinose, xylose, ribose, lyxose, and the like. Among compounds readily hydrolyzable to monosaccharides may be named alkylglucosides such as methylglucoside and ethylglucoside, anhydro sugars such as levoglucosan, and oligosaccharides and polysaccharides, such as maltose, lactose, sucrose, raffinose, dextrins, starches, gums, corn syrups, wood sugars, and the like. For reasons or availability and low cost, the preferred starting product is glucose or a compound directly hydrolyzable to glucose.

Typical examples of aliphatic glycols which may be used in the process of the present invention are 1,2-propanediol, 1,3-propanediol, 1,4-butanediol, 1,4-butanediol, 1,4-butynediol, 1,2-butanediol, and 1,3-butanediol. Since it is desirable to remove all unreacted glycol from the product, it is desirable that the glycol employed have a boiling point below that of the boiling point of the monohydric alcohol being used. Because of its low cost and its low toxicity, propylene glycol is the preferred glycol.

The preferred acid catalyst is sulfuric acid due to its low cost and its ease of removal after the reaction is completed, although other acid catalysts, such as hydrochloric acid, phosphoric acid, phosphorus acid, boron trifluoride, toluene sulfonic acid, and ion exchange resins in the acid form may also be used. The amount of acid catalyst used may be between about 0.002% and about 2.0%, and preferably between about 0.005% and about 1.0%, based on the weight of the total charge. While less catalyst may be used, the time for the reaction will be longer and thus would be economically undesirable. While more catalyst may be used, it would be wasteful since the time of reaction is satisfactory at lower catalyst concentrations.

The monohydric alcohols containing from 8 to 25 carbon atoms used in the present invention may be primary or secondary alcohols, straight or branched chain, saturated or unsaturated, alkyl or aralkyl alcohols, ether alcohols, cyclic alcohols, or heterocyclic alcohols. In general, these alcohols are insoluble in water and have essentially no solvent power for the sugar molecule. Illustrative examples of the higher molecular weight alcohols which may be employed in the present invention are octyl alcohol, nonyl alcohol, decyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, pentacosyl alcohol, oleyl alcohol, isoborneol alcohol, hydroabietyl alcohol, phenoxyethanol, phenoxy-polyethoxyethanol containing five ethoxy groups, 1H,1H,11H-eicosofluoro-1-undecanol, 2-methyl, 7-ethyl, 4-undecanol, and the like. A preferred group of alcohols are those having the formula ROH wherein R represents and alkyl groups having from 8 to 25 carbon atoms. A particularly preferred group of alcohols are those wherein R represents an alkyl radical having from 10 to 18 carbon atoms.

The molar ratio of monohydric aclohol to monosaccharides is suitably from about 0.005 to about 15, and preferably between about 0.01 to about 12. Although higher and lower ratios may be used, no advantage is gained thereby. Higher ratios result in more unreacted monohydric alcohol to be removed at the completion of the reaction and is thus uneconomical. Lower ratios result in glycosidic compositions with reduced surface active properties. The particular molar ratio to be used depends mainly on the amount of glycosidation desired on the monohydric alcohol. A low molar ratio is used to prepare glycosides containing more than one monosaccharide unit per monohydric alcohol moiety, that is, polysaccharide glycosides. A higher molar ratio is used when essentially monoglycosidation is desired. Thus, it is possible to select the hydrophile-lipophile balance and the water-solubility of the glycoside by controlling the extent of polyglycosidation.

When it is desired to have a product low in monohydric alcohol glycosides, then the reaction mixture should have low monohydric alcohol to sugar ratio, along with a low monohydric alcohol to glycol ratio. On the other hand, when it is desired to produce a product high in monohydric alcohol glycosides and low in glycol glycosides, then the reaction mixture should have a high monohydric alcohol to sugar ratio along with a high monohydric alcohol to glycol ratio.

The molar ratio of glycol to monosaccharide employed may vary from about 0.3 to about 10, and preferably from about 0.5 to about 8. Although useful products may still be produced by the use of higher or lower ratios, the use of higher ratios would mean the necessity of recovering large amounts of excess glycols and thus would be highly uneconomical. The use of lower ratios would result in the gradual loss of fluidity in the product, thus necessitating the use of expensive heavy duty equipment and the loss of an advantage of this invention.

The process of the present invention is suitably carried out at a temperature from 70° C. to about 160° C., and preferably from 90° C. to 150° C. Although higher and lower temperatures may be used, no advantage is gained thereby. Lower temperatures result in longer reaction times and higher temperatures may result in some degradation and discoloration.

While the compositions of the resulting glycosidic mixture is primarily determined in such a manner by the ratio of monohydric alcohol to sugar and to glycol, in the reaction mixture, it is also possible, to a certain extent to vary the composition of the resulting product by a variation in the mode of reaction. Thus, by carrying out the reaction until only the water of reaction has been distilled off, one composition is produced. However, if the reaction is continued further, after all of the water of reaction has been distilled off, so that portions of the glycol and monohydric alcohol are also distilled off, there will be obtained products with successively increasing proportions of monohydric alcohol glycosides and successively lower proportions of glycol glycosides.

The products of the present invention are advantageously employed for a variety of purposes, such as detergents, gelling agents, lubricants, wetting agents, dyeing assistants, textile softeners and food emulsifiers.

The following examples are illustrative of the present invention. It will be appreciated, of course, that the proportions of reactants, time of reaction, and temperature of reaction are somewhat variable; and selection of different sugars, glycols, monohydric alcohols, and catalyst can readily be effected in the light of the guiding principles and teachings which are disclosed herein. The examples, therefore, are not in any way to be construed as limitative of the scope of the present invention. All parts and percentages are by weight, unless otherwise stated.

Examples 1 through 8, shown in Table I, illustrate the effect of variations in the ratios of propylene glycol to sugar, and monohydric alcohol to sugar, in the reaction mixture, on the composition of the resulting glycosidic mixture. Method 1 is by reaction of the reaction mixture to the point where all of the water of reaction has been removed by distillation, along with minor amounts of propylene glycol and n-decanol which were unavoidably co-distilled along with the water. Method 2 is by reaction beyond this point whereby further amounts of propylene glycol and n-decanol were removed by distillation.

The preparation of these examples all follow the same general pattern. The procedure is to heat the particular reaction mixture of proplene glycol-sugar-n-decanol-catalyst in a three-necked flask provided with a stirrer, thermometer, distillation neck, condenser and a receiver, to temperatures of approximately 110–130° C. under an initial pressure of approximately 150 mm. mercury, to remove the water of reaction. The pressure is gradually reduced to 60 mm. mercury to hold the vapor temperature within the range of 90–120° C. For Method 1, the reaction is terminated when the evolution of water ceases, as shown by the drop in vapor temperature to approximately 40° C. or lower, at 60 mm. mercury pressure. The catalyst is then neutralized by the addition of sodium hydroxide and the unreacted propylene glycol and n-decanol is stripped by vacuum distillation. For Method 2, the reaction is continued further, after the evolution of water, by further decreasing the pressure to approximately 20–30 mm. mercury and distilling off further amounts of propylene glycol and n-decanol. After neutralization with sodium hydroxide, any free propylene glycol and n-decanol is stripped off, as with Method 1.

The mol percent composition of the resulting glucosides is calculated by a determination of the amount of propylene glycol and n-decanol which have not reacted as shown by analyses of the collected distillates and as free n-decanol in the product. The difference between these values and the amounts of propylene glycol and n-decanol charged into the reaction mixture is then the amount of each converted into glycosides. Since the glucose is completely reacted, the degree of glucosidation is then expressed as the number of glucose units reacted into each molar amount of combined propylene glycol and n-decanol.

The foam value is a measure of the surface activity of the product and is determined by shaking 20 ml. of solution containing 0.1 gram of product dissolved in 100 ml. of water, vigorously by hand for one minute, in a glass stoppered 100 ml. graduate cylinder. The foam is allowed to drain for one minute, then the height at the top of the foam is read off.

peratures of 95–100° C. under an initial pressure of 150 mm. mercury. The pressure is gradually decreased

TABLE I

| Example Number | 1 | 2 | 3 | 4 | 5 | 6 | 7 | 8 |
|---|---|---|---|---|---|---|---|---|
| Mols propylene glycol/mol glucose | 6 | 4 | 4 | 3 | 2.6 | 1.5 | 1 | 0.7 |
| Mols n-decanol/mol glucose | 12 | 6 | 6 | 3 | 1.5 | 0.8 | 0.04 | 0.03 |
| Concentrated sulfuric acid, percent of total charge | 0.05 | 0.03 | 0.03 | 0.02 | 0.03 | 0.05 | 0.04 | 0.03 |
| Method | [1] 2 | [2] 2 | 1 | [3] 2 | 1 | 1 | 1 | 1 |
| Mol percent n-decyl glucoside | 90 | 80 | 58 | 39 | 23 | 20 | 1.7 | 1.6 |
| Degree of glucosidation | 1.1 | 1.4 | 1.3 | 1.1 | 1.3 | 1.6 | 2.1 | 3 |
| Hydroxyl number | 717 | 768 | 893 | 879 | 991 | 1,010 | 1,081 | 1,056 |
| Foam value | 100 | 95 | 85 | 88 | 65 | 54 | 26 | 26 |

[1] Reacted till 98.6% of propylene glycol and 49.3% of n-decanol distilled.
[2] Reacted till 96.3% of propylene glycol and 42.8% of n-decanol distilled.
[3] Reacted till 46.1% of propylene glycol and 13.7% of n-decanol distilled.

The effect of decreasing ratios of glycol/sugar and n-decanol/sugar in decreasing the amount of n-decyl glucosides in the product may be seen, as the examples go from 1 to 8, with the resulting increase in degree of glycosidation, the increase in hydroxyl numbers, and the drop in the foam values.

The resulting increase in the n-decyl glucosides over the propylene glycol glucosides by carrying out the procedure according to Method 2 over that of Method 1 is seen in examples 2 and 3. These two examples both started with the same reaction mixture, but example 3 was reacted only to the point where the evolution of water of reaction was complete; whereas example 2 was continued further from that point on to remove further amounts of propylene glycol and n-decanol. This follows from the fact that as the distillation is continued, the ratio of glycol to n-decanol is being changed continuously, in favor of n-decanol. Thus the composition is enriched in favor of n-decyl glucosides. It can therefore be seen that innumerable combinations may be used to effect changes in the glycosides compositions of this invention.

EXAMPLE 9

A mixture of 54 grams of glucose (0.3 mol), 137 grams of propylene glycol (1.8 mols), 569 grams of n-decanol (3.6 mols) and 0.2 ml. of concentrated sulfuric acid are heated with stirring in a one liter, three-necked flask provided with a stirrer thermometer, and distillation neck, to a temperature of 120° C. at 150 mm. mercury pressure whereupon the water of reaction is distilled at a vapor temperature of 95–100° C. The pressure is gradually decreased to 65 mm. mercury in 15 minutes, at which time evolution of water of reaction ceases, the pressure is decreased to 30 mm. in another 15 minutes, to 20 mm. in another 20 minutes, to 15 mm. in another 20 minutes, and held at 10–15 mm. for a total of one hour and fifty minutes of reaction time. During this time the vapor temperature is at 110–115° C., resulting in the distillation of a total of 421 grams of distillate, consisting of 135 grams of propylene glycol and 281 grams of n-decanol. The catalyst is then neutralized by the addition of 0.32 grams of sodium hydroxide dissolved in 2 ml. of water. The product is then stripped to a temperature of 120° C. at 2 mm. pressure to yield 244 grams of n-decanol and 92.4 grams of product, an amber waxy solid. Analysis of the product shows a free reducing sugar content of 0.19%, hydroxyl number 717, and a free n-decanol content of 7.4%. The foam value is 100. The amount of propylene glycol and n-decanol found reacted into glucosides shows that the product consisted of 90 mol percent of n-decyl glucosides and 10 mol percent of propylene glycol glucosides, with an average degree of glucosidation of 1.1.

EXAMPLE 10

A mixture of 324 grams of glucose (1.8 mols), 206 grams of propylene glycol (2.7 mols), 227 grams of n-decanol (1.44 mols) and 0.2 ml. of concentrated sulfuric acid is heated in a one liter, three-neck flask provided with a stirrer, thermometer and distillation neck at 110–115° C. to remove the water of evolution at vapor temperatures of 95–100° C. under an initial pressure of 150 mm. mercury. The pressure is gradually decreased to 60 mm. in 45 minutes. The reaction is continued for another 30 minutes at 120° C. and 60 mm. pressure at which time the evolution of water of reaction has ceased, as indicated by vapor temperature of 35° C. At this time the distillate collected amounts to 55.5 grams, of which 32.4 grams is water of reaction, 9.5 grams is n-decanol and 13.6 grams is propylene glycol which co-distilled with the water. The catalyst is neutralized with 0.22 gram of sodium hydroxide dissolved in 2 ml. of water, and the remaining unreacted propylene glycol and n-decanol is distilled off to a temperature of 125° C. at 3 mm. pressure. There is obtained a product yield of 398 grams of a light amber glassy material. The distillate weighs 303 grams, of which 175 grams is n-decanol and 126 grams is propylene glycol. Analyses of the product show 0.25% free reducing sugar, hydroxyl number 1010, and 1.8% free n-decanol, 20 mol percent of n-decyl glucosides and a degree of glucosidation of 1.6. The foam value is 54.

EXAMPLE 11

An amount of 526 grams of corn syrup (44% water content, dextrose equivalent 72–75, of the 56% of solids, 65% is glucose, the rest being a complicated mitxure of low molecular weight polymers of glucose) is concentrated under reduced pressure to approximately 3.5% water content. There is then added to this concentrated corn syrup (equivalent to 1.7 mols of sugar) 206 grams of propylene glycol (2.7 mols), 142 grams of n-decanol (0.9 mol) and 0.4 ml. of concentrated sulfuric acid. Reaction is initiated at 110–115° C. under a pressure of 160 mm. of mercury, to hold the vapor temperature at approximately 95° C. After ½ hour the pressure is at 60 mm. mercury and the vapor temperature is 52° C. In ¾ hour, the evolution of water of reaction is over, as indicated by a vapor temperature of 37° C. at 60 mm. pressure. At this point there is co-distilled along with the water of reaction 15 grams of propylene glycol and 8 grams of n-decanol. The catalyst is then neutralized with 0.44 gram of sodium hydroxide dissolved in 2.5 ml. of water. Free propylene glycol (126 grams) and n-decanol left (115 grams) is stripped from the product to a temperature of 125° C. at 3 mm. mercury pressure, and the product is poured. The product is an amber colored glass, 357 grams. Analyses show 0.7% free reducing sugar, hydroxyl number 1023, free n-decanol 0.95%, 11 mol percent of n-decyl glucoside, degree of glucosidation 1.8, foam value 37.

EXAMPLE 12

A mixture of 300 grams of propylene glycol (3.94 mols), 30 grams of n-decanol (0.19 mol) and 0.7 ml. of concentrated sulfuric acid is heated to 110° C. with stirring in a one liter, three-neck flask provided with a stirrer, thermometer and distillation neck. There is then added to this stirred mixture 200 grams of commercial corn starch (equivalent to 1.09 mols of glucose, assuming a normal water content in the starch of 12%). Water distilled off from this stirred reaction mixture at a pot temperature of 120° C. and a vapor temperature of 97°

C., while the pressure is gradually lowered so that in 50 minutes the pressure is at 160 mm. mercury, in 70 minutes at 90 mm. In 95 minutes, the pressure is at 60 mm. the vapor temperature is at 120° C. In two hours the pressure is at 50 mm. where it is held for another 15 minutes, with the pot temperature at 115° C. At this point 173.3 grams of combined water, propylene glycol and n-decanol has been collected as distillate. The catalyst is then neutralized by the addition of 1.2 grams of sodium hydroxide dissolved in 3 ml. of water. The unreacted propylene glycol and n-decanol is then distilled off to a pot temperature of 125° C. and 3 mm. mercury pressure. The combined distillates weights 298.8 grams and contained 57.2 grams of propylene glycol and 29 grams of n-decanol. The product is a dark amber glassy material. The foam value is 33. Analyses show 0.08% free reducing sugar, hydroxyl number 1065 and 0.3% free n-decanol, 1 mol percent of n-decyl glucosides, degree of glucosidation 1.4.

EXAMPLE 13

A mixture of 180 grams (1 mol) of glucose, 76.1 grams of propylene glycol (1 mol), 46.7 grams of n-dodecanol (0.25 mol) and 0.1 ml. of concentrated sulfuric acid is reacted in a 500 ml. three neck flask provided with a stirrer, thermometer and distillation neck, at 115° C. and under 150 mm. pressure to distill off water of reaction at a vapor temperature of 90–95° C. The pressure is gradually reduced to 60 mm. in ½ hour, at which time the vapor temperature has dropped to 77° C., indicating no further evolution of water of reaction. The pressure is then decreased to 25 mm. and the reaction is continued for a total of 50 minutes at 115° C. There is distilled at this time a total of 29.5 grams of distillate, consisting of water of reaction and 2.4 grams of n-dodecanol and 9.1 grams propylene glycol. The catalyst is neutralized by the addition of 0.10 gram of sodium hydroxide in 2 ml. of water. The remaining unreacted propylene glycol, and n-dodecanol is distilled off to a temperature of 190° C. and 3 mm. pressure to yield 38.8 grams of n-dodecanol and 37.0 grams of propylene glycol. The product is 193 grams of an amber glassy material. Analyses show 0.06% free reducing sugar, hydroxyl number 1058, no free n-dodecanol, 7.2 mol percent of n-dodecyl glucosides, and a degree of glucosidation of 2.4. The foam value is 32.

EXAMPLE 14

A mixture of 324 grams of D-glucose, 285 grams of 2-butene-1,4-diol, 288 grams of oxo-tridecyl alcohol and 0.3 ml. of concentrated sulfuric acid is heated in a one liter, three-neck flask provided with a stirrer, thermometer, and distillation neck at 120° C. under a pressure of 100 mm. mercury. Water of reaction is distilled at vapor temperature of 95–100° C. while the pressure is gradually reduced to 60 mm. mercury in 45 minutes. The reaction is continued for another 30 minutes at 120° C. and 60 mm. pressure until evolution of water ceases as evidenced by the drop of vapor temperature to 40° C. The catalyst is neutralized with 0.33 grams of sodium hydroxide in 2 ml. of water. The unreacted 2-butene 1,4-diol and oxo-tridecyl alcohol is distilled off to a temperature of 150° C. at 0.3 mm. mercury pressure, to yield about 410 grams of an amber, glassy product.

EXAMPLE 15

A mixture of 324 grams of D-glucose, 276 grams of 1,4-butanediol, 268 grams of n-dodecanol and 0.3 ml. of concentrated sulfuric acid is heated in a one liter, three-neck flask provided with a stirrer, thermometer and distillation neck at 110–115° C. to remove the water of reaction at vapor temperature of 95–100° C. under a pressure of 150 mm. mercury. The pressure is gradually reduced to 60 mm. in 45 minutes. The reaction is continued at 120° C. and 60 mm. pressure for another thirty minutes at which time the evolution of water of reaction has ceased as indicated by a vapor temperature of 35° C. The catalyst is neutralized with the addition of 0.33 gram of sodium hydroxide dissolved in 2 ml. of water, and the remaining unreacted 1,4-butanediol and n-dodecanol is distilled off to a temperature of 185° C. at 3 mm. pressure to yield about 406 grams of an amber glassy glucoside product.

EXAMPLE 16

A mixture of 90 grams of D-glucose, 180 grams of 2,3-butanediol, 474 grams of n-decanol and 0.1 ml. of concentrated sulfuric acid is heated in a 500 ml., three-neck flask provided with a stirrer, thermometer and distillation neck to a temperature of 120° C. under a pressure of 100 mm. of mercury. Water of reaction is distilled off at vapor temperature of 95–100° C. while the pressure is gradually decreased to 60 mm. pressure in 45 minutes. In one hour the evolution of water ceases as indicated by a vapor temperature of 35° C. The catalyst is neutralized with 0.16 gram of sodium hydroxide. Unreacted 2,3-butanediol and n-decanol is distilled off to a temperature of 125° C. at 3 mm. of mercury pressure. There is obtained about 145 grams of an amber, glassy, glucoside product.

Although this invention has been described with reference to specific monosaccharides, compounds hydrolyzable to monosaccharides, monohydric alcohol, aliphatic glycols, and acid catalysts and to specific processes and method steps, it will be apparent that other equivalent materials may be substituted for those specifically described and the method steps and types of processes may be altered, all within the spirit and scope of this invention.

Having described the invention, what is desired to be secured by Letters Patent is:

1. A process for the preparation of glycoside compositions which comprises reacting a compound selected from the group consisting of monosaccharides and compounds readily hydrolyzable to monosaccharides, with a mixture of a monohydric alcohol containing from 8 to 25 carbon atoms and an aliphatic glycol containing from 3 to 5 carbon atoms, said reaction being conducted in the presence of an acid catalyst and at a reaction temperature of from about 70° C. to about 160° C.

2. A product prepared by the process of claim 1.

3. A process of claim 1 wherein from about 0.3 to about 10 mols of said aliphatic glycol are used per mol of said monosaccharide.

4. A process of claim 3 wherein from about 0.005 to about 15 mols of said monohydric alcohol is used per mol of monosaccharide.

5. A process of claim 4 wherein from about 0.5 to about 8 mols of said aliphatic glycol are used per mol of monosaccharide.

6. A process of claim 5 wherein from about 0.01 to about 12 mols of said monohydric alcohol is used per mol of said monosaccharide.

7. A process of claim 4 wherein the monosaccharide is glucose.

8. A process of claim 4 wherein the amount of acid catalyst employed is from about 0.002% to about 2%.

9. A process for the preparation of a glycoside composition which comprises reacting one mol of a compound selected from the group consisting of monosaccharides and compounds hydrolyzable to monosaccharides, with from about 0.005 to about 15 mols of a monohydric alcohol containing from 8 to 25 carbon atoms and with from about 0.3 to about 10 mols of an aliphatic glycol containing from 3 to 5 carbon atoms, said reaction being conducted in the presence of from about 0.002% to about 2% of an acid catalyst and said reaction being carried out at a temperature from about 70° C. to about 160° C.

10. A process of claim 9 wherein the acid catalyst is sulfuric acid.

11. A process of claim 1 which comprises reacting one mol of a compound selected from the group consisting of monosaccharides and compounds hydrolyzable to monosaccharides, with from about 0.005 to about 15 mols of a monohydric alcohol containing from 10 to 18 carbon atoms and with from about 0.3 to about 10 mols of an aliphatic glycol containing from 3 to 5 carbon atoms, said reaction being conducted in the presence of a catalytic amount of an acid catalyst and said reaction being carried out at a temperature which results in the formation of a glycoside.

12. A process of claim 11 wherein the water of reaction is distilled off as it is formed and the reaction is continued after evolution of water ceases by removing glycol and monohydric alcohol from the reaction mixture.

References Cited
UNITED STATES PATENTS

| | | | |
|---|---|---|---|
| 2,407,003 | 9/1946 | Griffin | 260—210 R |
| 3,219,656 | 11/1965 | Boettner | 260—210 R |
| 3,450,690 | 6/1969 | Gibbons et al. | 260—210 R |
| 3,565,885 | 2/1971 | Molotsky et al. | 260—210 R |

LEWIS GOTTS, Primary Examiner

J. R. BROWN, Assistant Examiner

U.S. Cl. X.R.

8—93; 252—8.9, 52, 89, 316, 352

UNITED STATES PATENT OFFICE
CERTIFICATE OF CORRECTION

PATENT NO. : 3,772,269
DATED : November 13, 1973
INVENTOR(S) : Baak W. Lew

It is certified that error appears in the above-identified patent and that said Letters Patent are hereby corrected as shown below:

Column 2, line 28, "solvet" should read -- solvent --.

Column 2, line 54, "or" should read -- of --.

Column 3, line 30, "aclohol" should read -- alcohol --.

Column 7, line 13, "weights" should read -- weighs --.

Signed and Sealed this sixth Day of April 1976

[SEAL]

Attest:

RUTH C. MASON
*Attesting Officer*

C. MARSHALL DANN
*Commissioner of Patents and Trademarks*